(12) United States Patent
Kim et al.

(10) Patent No.: US 12,066,057 B2
(45) Date of Patent: Aug. 20, 2024

(54) BEARING ASSEMBLY

(71) Applicant: SEGOS CO., LTD., Incheon (KR)

(72) Inventors: Duc Hoi Kim, Incheon (KR); Ro Hee Lee, Incheon (KR); Sai Ryun Kim, Incheon (KR)

(73) Assignee: SEGOS CO., LTD., Incheon (KR)

( * ) Notice: Subject to any disclaimer, the term of this patent is extended or adjusted under 35 U.S.C. 154(b) by 179 days.

(21) Appl. No.: 17/762,487

(22) PCT Filed: Jul. 27, 2020

(86) PCT No.: PCT/KR2020/009880
§ 371 (c)(1),
(2) Date: Mar. 22, 2022

(87) PCT Pub. No.: WO2021/060689
PCT Pub. Date: Apr. 1, 2021

(65) Prior Publication Data
US 2022/0341465 A1  Oct. 27, 2022

(30) Foreign Application Priority Data

Sep. 24, 2019 (KR) .......................... 10-2019-0117676

(51) Int. Cl.
*F16C 33/58* (2006.01)
*F16C 19/02* (2006.01)

(52) U.S. Cl.
CPC ............ *F16C 33/585* (2013.01); *F16C 19/02* (2013.01)

(58) Field of Classification Search
CPC ........ F16C 19/02; F16C 19/18; F16C 19/181; F16C 19/183; F16C 19/184; F16C 19/187
See application file for complete search history.

(56) References Cited

U.S. PATENT DOCUMENTS

| | | |
|---|---|---|
| 1,622,880 A | 3/1927 | Perkins |
| 2,602,229 A | 7/1952 | Larsen et al. |
| (Continued) | | |

FOREIGN PATENT DOCUMENTS

| | | |
|---|---|---|
| DE | 10 2016 207 218 A1 | 11/2016 |
| GB | 2 068 479 A | 8/1981 |
| (Continued) | | |

OTHER PUBLICATIONS

Bearing 776800HU, Feb. 28, 2018, 6 pgs.
(Continued)

*Primary Examiner* — James Pilkington
(74) *Attorney, Agent, or Firm* — Sughrue Mion, PLLC (57) ABSTRACT

Provided in one embodiment of the present invention is a bearing assembly comprising: an outer ring in which a hollow is formed and which has a protrusion protruding toward a central direction along the inner circumferential surface and a first ball contact portion and a second ball contact portion that are formed by the protrusion; an inner ring having a third ball contact portion on the outer circumferential surface and forming a first track portion and a second track portion by being inserted into the hollow; and at least one bearing ball disposed between the outer ring and the inner ring to rotatably connect the outer ring and the inner ring, wherein the bearing balls are arranged in multiple rows in the first track portion and the second track portion and are configured to contact each of the ball contact portions.

5 Claims, 8 Drawing Sheets

(56) References Cited

U.S. PATENT DOCUMENTS

| | | | |
|---|---|---|---|
| 3,464,283 A | 9/1969 | Miller et al. | |
| 5,903,988 A | 5/1999 | Tochizawa et al. | |
| 9,188,107 B2 * | 11/2015 | Minadeo | F16C 33/6659 |
| 2016/0348715 A1 | 12/2016 | Serafini et al. | |
| 2019/0078289 A1 | 3/2019 | Matsuyama et al. | |

FOREIGN PATENT DOCUMENTS

| | | | |
|---|---|---|---|
| GB | 2321088 | * | 7/1998 |
| JP | 5-44721 A | | 2/1993 |
| JP | 8-232949 A | | 9/1996 |
| JP | 2001-82490 A | | 3/2001 |
| JP | 2003-120691 A | | 4/2003 |
| JP | 2005-105977 A | | 4/2005 |
| KR | 10-2009-0081183 A | | 7/2009 |
| KR | 10-2011-0125646 A | | 11/2011 |
| KR | 10-1439584 B1 | | 3/2014 |

OTHER PUBLICATIONS

International Search Report for PCT/KR2020/009880 dated, Oct. 27, 2020 (PCT/ISA/210).
Extended European Search Report dated Sep. 25, 2023 in Application No. 20868926.5.

* cited by examiner

BEARING ASSEMBLY

CROSS REFERENCE TO RELATED APPLICATIONS

This application is a National Stage of International Application No. PCT/KR2020/009880 filed Jul. 27, 2020, claiming priority based on Korean Patent Application No. 10-2019-0117676 filed Sep. 24, 2019, the entire disclosures of which are incorporated herein by reference.

TECHNICAL FIELD

The present invention relates to a bearing assembly, and more specifically, to a bearing assembly in which ball track portions formed with an outer ring and an inner ring in a double row are formed with straight or curved structures without having an additional undercut surface, bearing balls are formed to roll while in point or line contact with the ball track portions, and thus a weight is easily distributed, and manufacturing is easier.

BACKGROUND ART

A bearing assembly is a mechanical element which serves to fix a shaft of an object to a predetermined position and allows the shaft to rotate while supporting a weight of the shaft and a weight applied to the shaft.

Generally, a bearing assembly includes an inner ring coupled to a shaft, an outer ring coupled to the housing, and a rolling element which rolls between the outer ring and the inner ring.

In this case, according to the conventional technology, undercut surfaces, on which rolling elements are seated, are formed in track portions of an inner ring and an outer ring, and the rolling elements are configured to rotate on the undercut surfaces. That is, when a bearing assembly is manufactured, a process of forming an undercut shape allowing the rolling elements to be seated on the inner ring and the outer ring is additionally required, and thus a manufacturing process becomes complicated, and manufacturing costs increase.

In addition, since the rolling elements are fixedly coupled while in contact with the undercut surfaces of the inner ring and the outer ring, movement thereof in a width direction (W) of the bearing assembly cannot be easily absorbed, and accordingly, the dimensional accuracy of the bearing assembly is low, and there is an unstable dimension problem in a home appliance to which the bearing assembly is applied.

RELATED ART (Patent Document 1) Korean Patent Publication No. 10-1439584 B1 (Sep. 2, 2014)

DISCLOSURE

Technical Problem

The present invention is directed to providing a bearing assembly in which ball track portions in a double row formed by an outer ring and an inner ring are formed with straight or curved structures without having an additional undercut surface, bearing balls are formed to roll while in point or line contact with the ball track portions, and thus a weight is easily distributed, and manufacturing is easier.

Technical Solution

One aspect of the present invention provides a bearing assembly including an outer ring, in which a hollow is formed, and which includes a protrusion protruding along an inner circumferential surface of the outer ring in a central direction and a first ball contact portion and a second ball contact portion which are formed by the protrusion, an inner ring having an outer circumferential surface on which a third ball contact portion is formed and insertion-coupled to the hollow to form a first track portion and a second track portion, and one or more bearing balls which are disposed between the outer ring and the inner ring and rotatably connect the outer ring and the inner ring, wherein the bearing balls are disposed in the first track portion and the second track portion in a double row and are in contact with the ball contact portions.

The first ball contact portion of the outer ring may include a first contact surface part and a second contact surface part, and the bearing balls may be in point contact with the first contact surface part and the second contact surface part.

The second ball contact portion of the outer ring may include a third contact surface part and a fourth contact surface part, and the bearing balls may be in point contact with the third contact surface part and the fourth contact surface part.

The third ball contact portion of the inner ring may include a fifth contact surface part and a sixth contact surface part, and the bearing balls may be in point contact with the fifth contact surface part and the sixth contact surface part.

The inner ring may include a support part having a circular shape and an insertion part which has a circular shape, is formed on one end surface of the support part, has a diameter smaller than a diameter of the support part, and is inserted into the hollow of the outer ring, and the third ball contact portion may extend from an outer circumferential surface of the insertion part and may be connected to one end surface of the support part.

A diameter (L) of the hollow may be smaller than a diameter (L1) of the support part and greater than a diameter (L2) of the insertion part.

A diameter (D1) of the bearing ball may be greater than a length (D2) of the first contact surface part in a width direction (W).

The first ball contact portion of the outer ring may be formed in a curved shape, and a largest curvature (C1) of the first ball contact portion may be less than or equal to a curvature (C) of the bearing ball.

The second ball contact portion of the outer ring may be formed in a curved shape, and a largest curvature (C2) of the second ball contact portion may be less than or equal to a curvature (C) of the bearing ball.

The third ball contact portion of the inner ring may include a fifth contact surface part and a sixth contact surface part, the sixth contact surface part may be formed in a curved shape, and a largest curvature (C3) of the sixth contact surface part may be less than or equal to a curvature (C) of the bearing ball.

Advantageous Effects

According to one aspect of the present invention, since additional undercut surfaces on which bearing balls are seated are not formed in an inner circumferential surface of an outer ring and an outer circumferential surface of an inner ring, and ball contact portions of the outer ring and the inner ring are formed with straight or curved structures, an additional undercut machining process is not required, and thus manufacturing is easier.

In addition, since the outer ring and the inner ring are formed so that predetermined movement is possible in a width direction (W), when the bearing assembly is applied to a home appliance, an unstable dimension problem due to a dimension in a home appliance can be solved.

In addition, since the bearing balls are formed to be in point contact with the outer ring and the inner ring at four to eight points or in line contact therewith, a weight applied to the bearing assembly can be effectively distributed.

Effects of the present invention are not limited to the above-described effects and should be understood to include all effects which may be inferred from the detailed description of the present invention or elements of the present invention described in the claims.

MODES OF THE INVENTION

Hereinafter, the present invention will be described in detail with reference to the accompanying drawings. However, embodiments of the present invention may be implemented in several different forms and are not limited to embodiments described herein. In addition, parts irrelevant to description are omitted in the drawings in order to clearly explain embodiments of the present invention. Similar parts are denoted by similar reference numerals throughout this specification.

Throughout this specification, when a part is referred to as being "connected" to another part, it includes "directly connected" and "indirectly connected" via an intervening part. Also, when a certain part "includes" a certain component, this does not exclude other components unless explicitly described otherwise, and other components may in fact be included.

Hereinafter, embodiments of the present invention will be described in detail with reference to the accompanying drawings.

Figure 1:
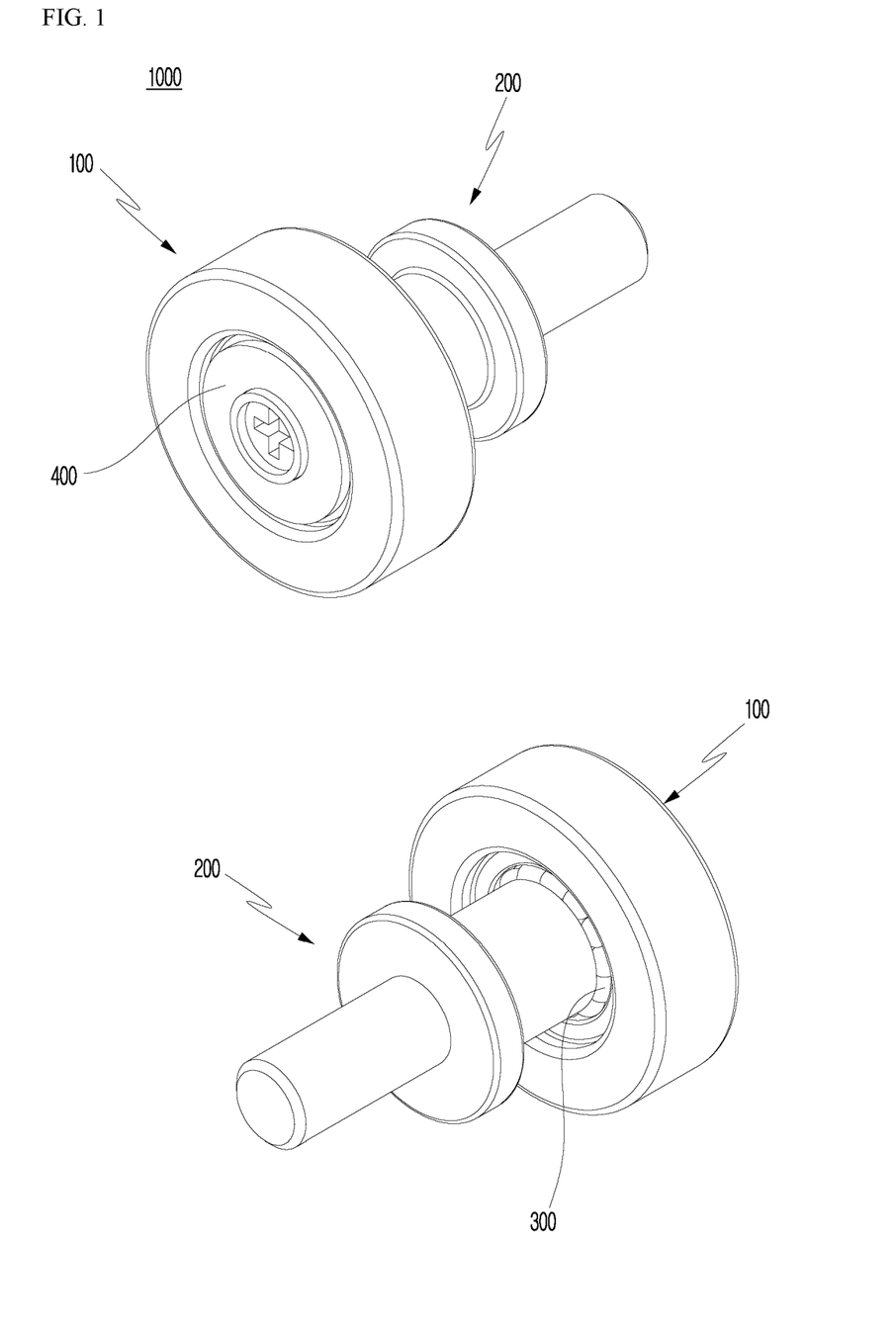
FIG. 1 is a perspective view illustrating a bearing assembly according to one embodiment of the present invention.
Figure 2:
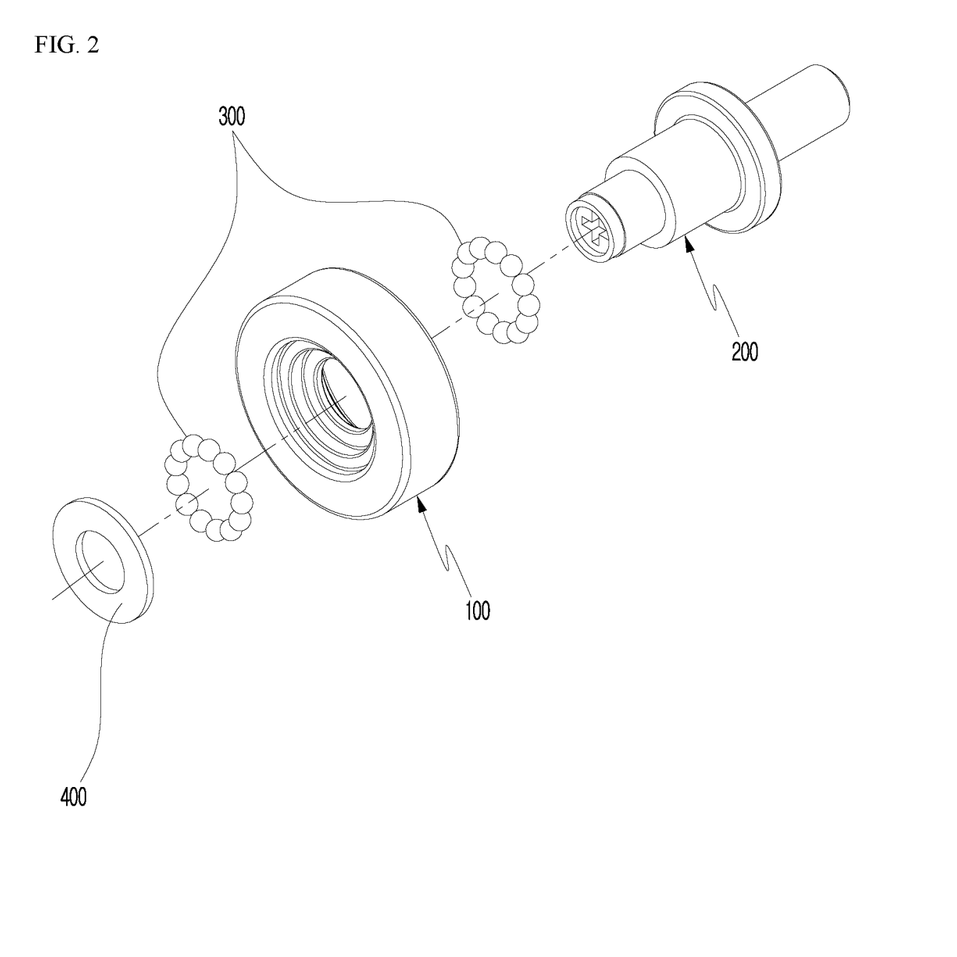
FIG. 2 is an exploded perspective view illustrating the bearing assembly according to one embodiment of the present invention.
Figure 3:
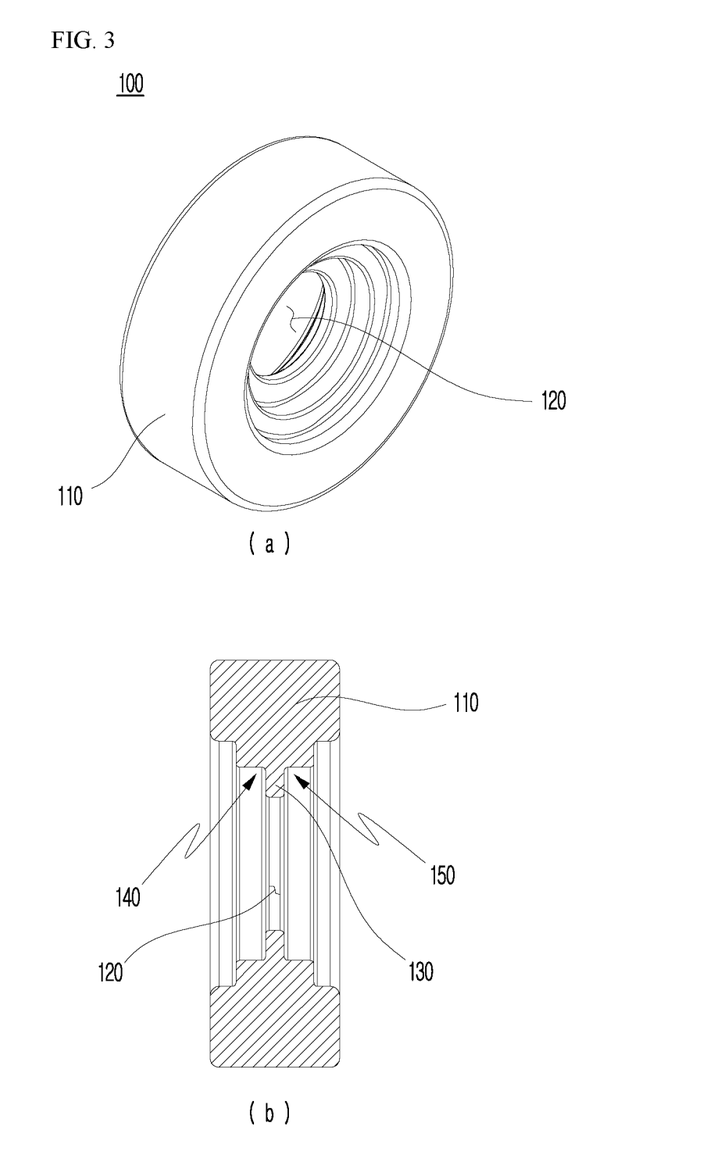
FIG. 3 is a set of perspective and cross-sectional views illustrating an outer ring according to one embodiment of the present invention.
Figure 4:
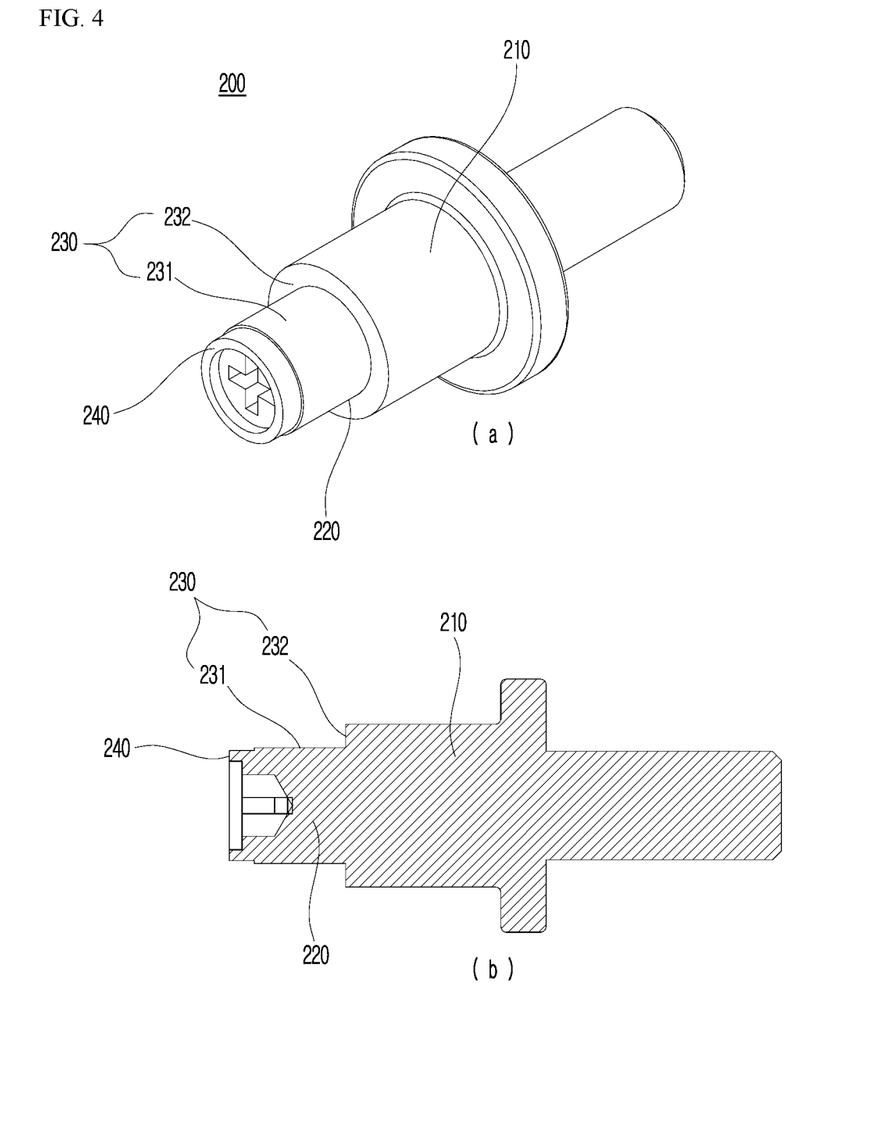
FIG. 4 is a set of perspective and cross-sectional views illustrating an inner ring according to one embodiment of the present invention.
Figure 5:
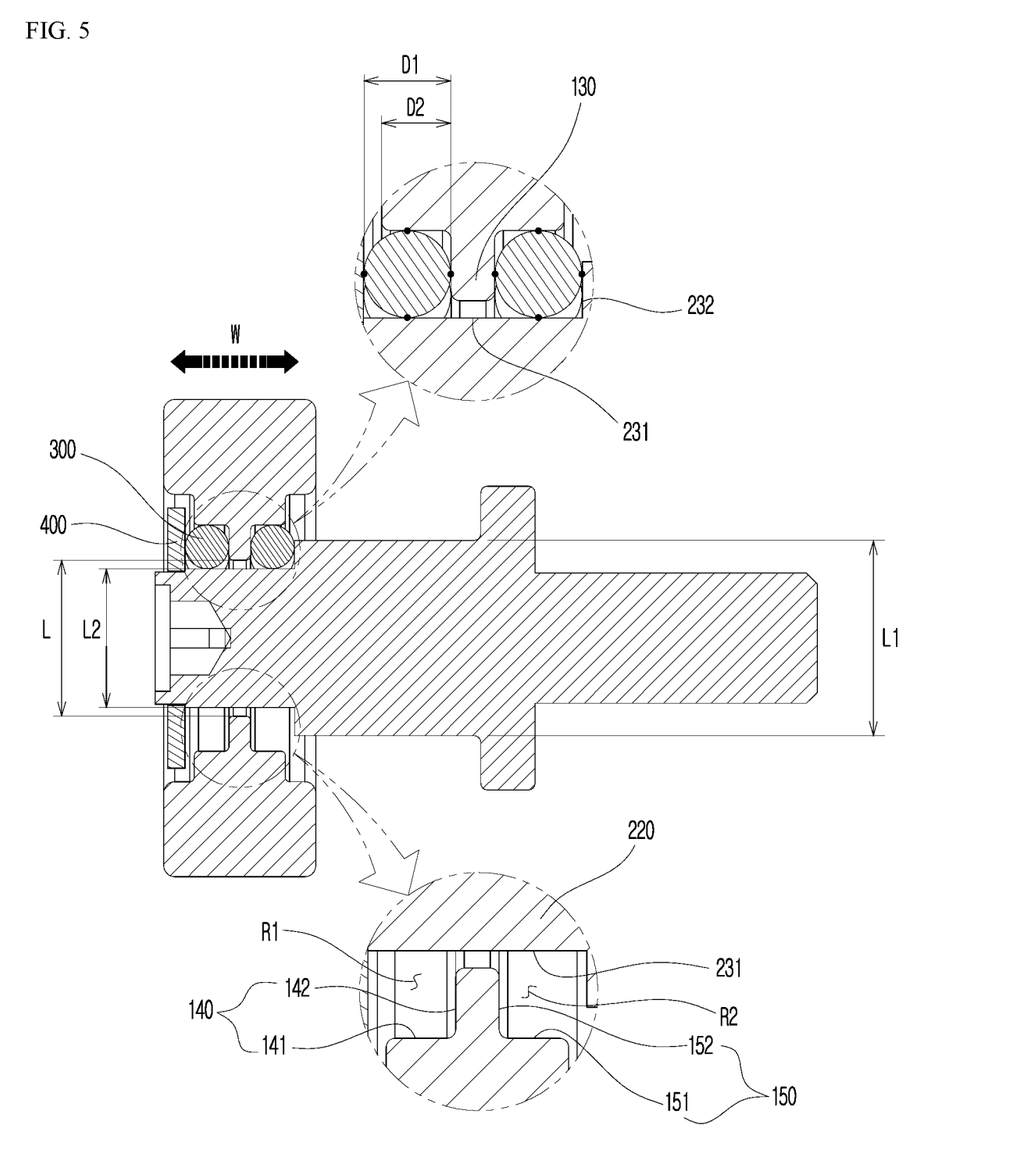
FIG. 5 is a set of cross-sectional and partially enlarged views illustrating the bearing assembly according to one embodiment of the present invention.

FIG. 1 is a perspective view illustrating a bearing assembly according to one embodiment of the present invention, FIG. 2 is an exploded perspective view illustrating the bearing assembly according to one embodiment of the present invention, FIG. 3 is a set of perspective and cross-sectional views illustrating an outer ring according to one embodiment of the present invention, FIG. 4 is a set of perspective and cross-sectional views illustrating an inner ring according to one embodiment of the present invention, and FIG. 5 is a set of cross-sectional and partially enlarged views illustrating the bearing assembly according to one embodiment of the present invention.

Referring to FIGS. 1 to 4, a bearing assembly 1000 of the present invention includes an outer ring 100, an inner ring 200, and one or more bearing balls 300.

The outer ring 100 includes a first ball contact portion 140 and a second ball contact portion 150 which are divided by a protrusion 130 protruding along an inner circumferential surface in a central direction. More specifically, the outer ring 100 includes a main body part 110 having a predetermined width and a circular shape, a hollow 120 formed in a central portion of the main body part 110, and the first ball contact portion 140 and the second ball contact portion 150 which are divided by the protrusion 130 protruding along an inner circumferential surface of the main body part 110 in the central direction and are in contact with the bearing balls 300.

The inner ring 200 includes a third ball contact portion 230 in contact with the bearing balls 300 on an outer circumferential surface of the inner ring 200 and is insertion-coupled to the hollow of the outer ring 100. A first track portion R1 and a second track portion R2 divided by the protrusion 130 are formed so that the bearing balls 300 are disposed in a double row when the inner ring 200 is inserted into the outer ring 100.

In this case, the inner ring 200 includes a support part 210 having a circular shape, an insertion part 220 which has a circular shape, is formed on one end surface of the support part 210, has a diameter smaller than a diameter of the support part 210, and is inserted into the hollow 120, and a third ball contact portion 230 which extends from an outer circumferential surface of the insertion part 220, is connected to one end surface of the support part 210, and is in contact with the bearing balls 300.

Meanwhile, a diameter L of the hollow 120 is smaller than a diameter L1 of the support part 210 and greater than a diameter L2 of the insertion part 220.

One or more bearing balls 300 are disposed between the outer ring 100 and the inner ring 200 to rotatably connect the outer ring 100 and the inner ring 200.

In this case, as described above, the bearing balls 300 are inserted into the first track portion R1 and the second track portion R2, disposed in the double row in a circumferential direction, and are in point contact with the ball contact portions 140, 150, and 230. More specifically, the bearing balls 300 are disposed in point contact with the first ball contact portion 140 and the second ball contact portion 150 of the outer ring 100 and the third ball contact portion 230 of the inner ring 200 so that the bearing balls 300 roll.

According to one embodiment, the first ball contact portion 140 may include a first contact surface part 141 and a second contact surface part 142, and the bearing balls 300 may be formed in point contact with the first contact surface part 141 and the second contact surface part 142 in the first track portion R1.

In addition, the second ball contact portion 150 may include a third contact surface part 151 and a fourth contact surface part 152, and the bearing balls 300 may be formed in point contact with the third contact surface part 151 and the fourth contact surface part 152 in the second track portion R2.

According to one embodiment, the third ball contact portion 230 may include a fifth contact surface part 231 and a sixth contact surface part 232, and the bearing ball 300 may be formed in point contact with the fifth contact surface part and the sixth contact surface part.

That is, the bearing balls 300 positioned in the first track portion R1 are formed in contact with the first contact surface part 141 and the second contact surface part 142 of the outer ring 100 and the fifth contact surface part 231 of the inner ring 200 so that the bearing balls 300 roll, and the bearing balls 300 positioned in the second track portion R2 are formed in contact with the third contact surface part 151 and the fourth contact surface part 152 of the outer ring 100 and the fifth contact surface part 231 and the sixth contact surface part 232 of the inner ring 200 so that that the bearing balls 300 roll.

That is, additional undercut surfaces on which the bearing balls 300 are seated are not formed on the inner circumferential surface of the outer ring 100 and the outer circumferential surface of the inner ring 200, the ball contact portions 140, 150, and 230 of the outer ring 100 and the inner ring 200 are formed with straight structures, and thus an additional undercut machining process is not required, making manufacturing easier.

In addition, since the bearing balls 300 are disposed in the double row in the first track portion R1 and the second track portion R2 and are in point contact with the ball contact portions 140, 150, and 230 formed with the straight structures, a weight distribution effect is high, and rolling sensitivity can be improved.

According to one embodiment, the bearing assembly 1000 of the present invention may further include a fixing part 400 coupled to the inner ring 200 so that the outer ring 100 and the inner ring 200 are fixedly coupled at a specific position in a width direction W.

More specifically, a coupling part 240, which may be coupled to the fixing part 400, may be provided at an end of the insertion part 220 of the inner ring 200, and a diameter of the coupling part 240 may be smaller than a diameter of the insertion part 220.

That is, the fixing part 400 is formed to be fitted to an outer circumferential surface of the coupling part 240 formed on an end of the insertion part 220 when the outer ring 100 and the inner ring 200 are coupled, and the insertion part 220 passes through and is inserted into the hollow 120.

In this case, the coupling of the coupling part 240 and the fixing part 400 is not limited to the fitting and may be performed in any of various manners.

When the fixing part 400 is deeply insertion-coupled to the coupling part 240 in the width direction W, the bearing balls 300 are formed in point contact therewith at eight points in the first track portion R1 and the second track portion R2, and when the fixing part 400 is shallowly insertion-coupled to the coupling part 240 in the width direction W, the bearing balls 300 are formed in point contact therewith at four or seven points in the first track portion R1 and the second track portion R2.

That is, the outer ring 100 and the inner ring 200 may be coupled so that predetermined movement thereof is possible in the width direction W.

More specifically, in the bearing assembly 1000 of the present invention, since the ball contact portions 140, 150, and 230 of the outer ring 100 and the inner ring 200 are formed with the straight structures instead of an additional undercut surface on which the bearing balls 300 are seated being formed, the outer ring 100 and the inner ring 200 may be coupled so that the predetermined movement thereof is possible in the width direction W.

That is, the bearing balls 300 may be formed to roll while in point contact with the first ball contact portion 140, the second ball contact portion 150, and the third ball contact portion 230 at four to eight points according to a use condition.

Since the outer ring 100 and the inner ring 200 are formed so that the predetermined movement is possible in the width direction W, when the bearing assembly 1000 of the present invention is applied to a home appliance, an unstable dimension problem due to a dimension in the home appliance may be solved. In addition, since the bearing balls 300 are formed in point contact with the corresponding ball contact portions 140, 150, and 230 at four to eight points, a weight applied to the bearing assembly 1000 can be effectively distributed.

According to one embodiment, a diameter D1 of the bearing ball may be greater than a length D2 of the first contact surface part 141 in the width direction W.

That is, when the fixing part 400 is coupled to the coupling part 240 of the inner ring 200, a gap between the fixing part 400 and the outer ring 100 may be formed, the fixing part 400 is in point contact with the bearing balls 300, a contact surface with the outer ring 100 is not formed, and thus noise due to friction in operation is prevented so that operation sensitivity can be improved.

Figure 6:
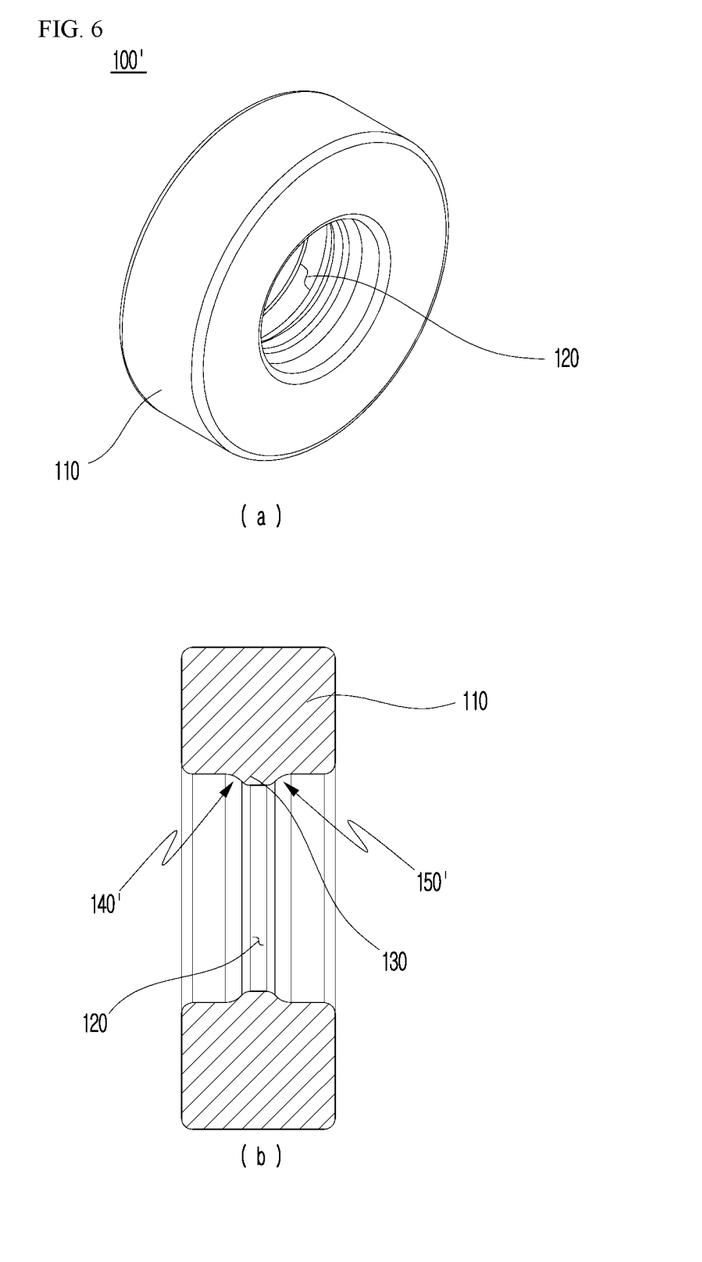
FIG. 6 is a set of perspective and cross-sectional views illustrating an outer ring according to another embodiment of the present invention.
Figure 7:
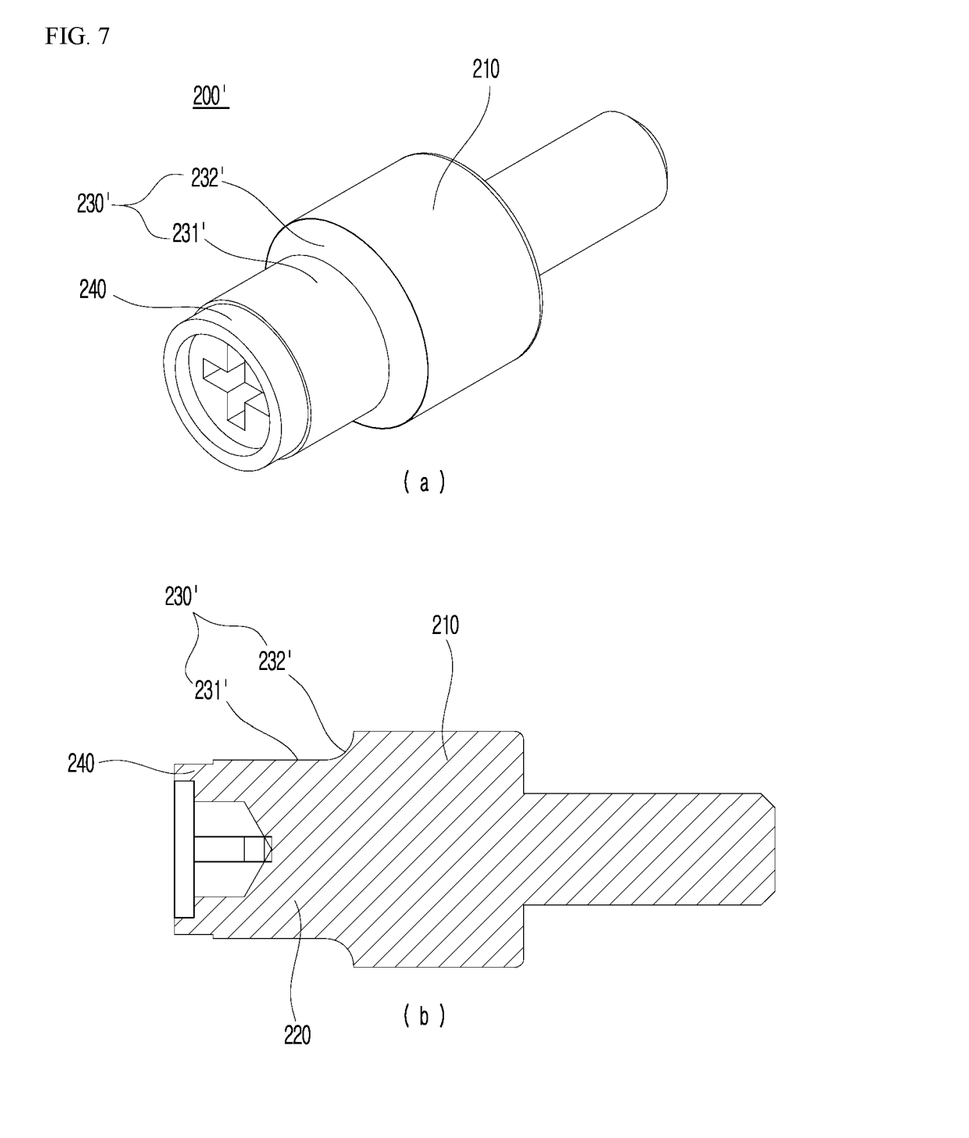
FIG. 7 is a set of perspective and cross-sectional views illustrating an inner ring according to another embodiment of the present invention.
Figure 8:
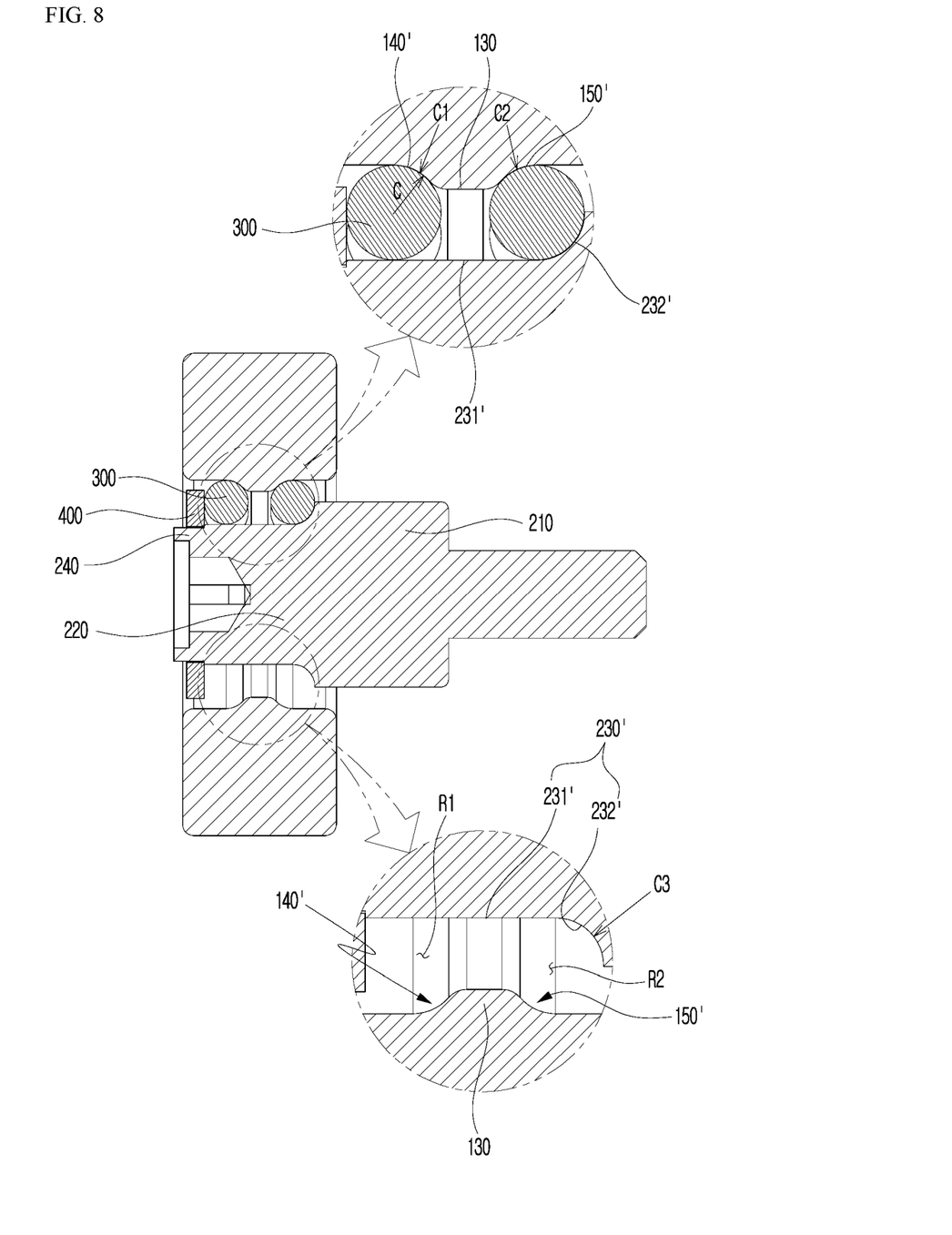
FIG. 8 is a set of cross-sectional and partially enlarged views illustrating a bearing assembly according to another embodiment of the present invention.

FIG. 6 is a set of perspective and cross-sectional views illustrating an outer ring according to another embodiment of the present invention, FIG. 7 is a set of perspective and cross-sectional views illustrating an inner ring according to another embodiment of the present invention, and FIG. 8 is a set of cross-sectional and partially enlarged views illustrating a bearing assembly according to another embodiment of the present invention.

Referring to FIGS. 6 to 8, an outer ring 100' includes a first ball contact portion 140' and a second ball contact portion 150' divided by a protrusion 130 protruding along an inner circumferential surface thereof in a central direction. More specifically, the outer ring 100 includes a main body part 110 having a circular shape, a hollow 120 formed in a central portion of the main body part 110, and the first ball contact portion 140' and the second ball contact portion 150' divided by the protrusion 130 protruding along an inner circumferential surface of the main body part 110 in the central direction and in contact with bearing balls 300.

In this case, the first ball contact portion 140' of the outer ring 100' is formed in a curved shape, and a largest curvature C1 of the first ball contact portion 140' is less than or equal to a curvature C of the bearing ball 300.

Similarly, the second ball contact portion 150' of the outer ring 100' is formed in a curved shape, and a largest curvature C2 of the second ball contact portion 150' is less than or equal to the curvature C of the bearing ball 300.

Accordingly, since the bearing balls 300 roll while in line contact with the first ball contact portion 140' and the second ball contact portion 150', not only is a weight easily distributed, but also friction noise due to the conventional surface contact is prevented so that operability can be improved.

Meanwhile, the inner ring 200' includes a third ball contact portion 230' in contact with the bearing balls 300 on an outer circumferential surface thereof and insertion-coupled to the hollow of the outer ring 100'. A first track portion R1 and a second track portion R2 divided by the protrusion 130 are formed so that the bearing balls 300 are disposed in a double row when the inner ring 200' is inserted into the outer ring 100'.

In addition, the inner ring 200' includes a support part 210 having a circular shape, an insertion part 220 which has a circular shape, is formed on one end surface of the support part 210, has a diameter smaller than a diameter of the support part 210, and is inserted into the hollow 120, and a third ball contact portion 230' which extends from an outer circumferential surface of the insertion part 220 and is connected to the one end surface of the support part 210, and is in contact with the bearing ball 300.

In this case, the third ball contact portion 230' of the inner ring 200' includes a fifth contact surface part 231' and a sixth contact surface part 232', the sixth ball contact surface part 232' is formed in a curved shape, and a largest curvature C3 of the sixth ball contact surface part 232' is less than or equal to the curvature C of the bearing ball.

Accordingly, since the bearing balls 300 of the first track portion R1 are in point contact with the fifth contact surface part 231', and the bearing balls 300 of the second track portion R2 roll while in line contact with the sixth contact surface part 232', not only is a weight easily distributed, but also friction noise due to the conventional surface contact is prevented so that operability can be improved.

The above description of the present invention is only exemplary, and it will be understood by those skilled in the art that the present invention may be easily changed to other concrete forms without changing the technological spirit and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

It should be interpreted that the scope of the present invention is defined by the appended claims and encompasses all modifications or alterations derived from meanings, the scope, and equivalents of the appended claims.

REFERENCE NUMERALS

1000: BEARING ASSEMBLY
100, 100': OUTER RING
110: MAIN BODY PART
120: HOLLOW
130: PROTRUSION
140, 140': FIRST BALL CONTACT PORTION
141: FIRST CONTACT SURFACE PART
142: SECOND CONTACT SURFACE PART
150, 150': SECOND BALL CONTACT PORTION
151: THIRD CONTACT SURFACE PART
152: FOURTH CONTACT SURFACE PART
200, 200': INNER RING
210: SUPPORT PART
220: INSERTION PART
230, 230': THIRD BALL CONTACT PORTION
231, 231': FIFTH CONTACT SURFACE PART
232, 232': SIXTH CONTACT SURFACE PART
240: COUPLING PART
300: BEARING BALL
400: FIXING PART

The invention claimed is:

1. A bearing assembly comprising:
an outer ring in which a hollow is formed and which includes a protrusion protruding along an inner circumferential surface of the outer ring in a radial direction and a first ball contact portion and a second ball contact portion which are separated by the protrusion;
an inner ring having an outer circumferential surface on which a third ball contact portion is formed and inserted into the hollow to form a first track portion between the first ball contact portion and the third ball contact portion and a second track portion between the second ball contact portion and the third ball contact portion; and
a plurality of bearing balls which are disposed between the outer ring and the inner ring and rotatably connect the outer ring and the inner ring,
wherein the bearing balls are disposed in the first track portion and the second track portion to form a double row bearing with the plurality of balls contacting the respective ball contact portions,
wherein
the first ball contact portion of the outer ring includes a first contact surface part and a second contact surface part; and
the bearing balls are in point contact with the first contact surface part and the second contact surface part,
wherein a diameter (D1) of the bearing ball is greater than a length (D2) of the first contact surface part in a width direction (W).

2. The bearing assembly of claim 1, wherein:
the second ball contact portion of the outer ring includes a third contact surface part and a fourth contact surface part; and
the bearing balls are in point contact with the third contact surface part and the fourth contact surface part.

3. The bearing assembly of claim 1, wherein:
the third ball contact portion of the inner ring includes a fifth contact surface part and a sixth contact surface part; and
the bearing balls are in point contact with the fifth contact surface part and the sixth contact surface part.

4. The bearing assembly of claim 1, wherein:
the inner ring includes a support part having a circular shape and an insertion part which has a circular shape, the insertion part is formed on one end surface of the support part and has a diameter smaller than a diameter of the support part, and the insertion part is inserted into the hollow of the outer ring; and
the third ball contact portion extends from an outer circumferential surface of the insertion part and is connected to one end surface of the support part.

5. The bearing assembly of claim 4, wherein a diameter (L) of the hollow is smaller than a diameter (L1) of the support part and greater than a diameter (L2) of the insertion part.

* * * * *